United States Patent
Bahari et al.

(10) Patent No.: US 11,518,860 B1
(45) Date of Patent: Dec. 6, 2022

(54) BIODEGRADABLE AND WATERPROOF SHAPED ARTICLES BASED ON THERMOPLASTIC STARCH WITH LOWER RETROGRADATION AND IMPROVED MECHANICAL PROPERTIES

(71) Applicants: Seyed Farshid Bahari, Groenlo (NL); Vahideh Azizi, Istanbul (TR); Marc Vanderbeken, Quebec (CA)

(72) Inventors: Seyed Farshid Bahari, Groenlo (NL); Vahideh Azizi, Istanbul (TR); Marc Vanderbeken, Quebec (CA)

( * ) Notice: Subject to any disclaimer, the term of this patent is extended or adjusted under 35 U.S.C. 154(b) by 0 days.

(21) Appl. No.: 17/832,722

(22) Filed: Jun. 6, 2022

(51) Int. Cl.
| | |
|---|---|
| *C08J 7/04* | (2020.01) |
| *C08J 3/09* | (2006.01) |
| *C08J 3/18* | (2006.01) |
| *B29C 43/00* | (2006.01) |
| *B65D 65/46* | (2006.01) |
| *B29L 31/00* | (2006.01) |

(52) U.S. Cl.
CPC .......... *C08J 7/0427* (2020.01); *B29C 43/003* (2013.01); *B29C 43/006* (2013.01); *B65D 65/466* (2013.01); *C08J 3/095* (2013.01); *C08J 3/18* (2013.01); *B29K 2003/00* (2013.01); *B29K 2995/006* (2013.01); *B29L 2031/712* (2013.01); *C08J 2303/02* (2013.01); *C08J 2401/08* (2013.01); *C08J 2467/04* (2013.01)

(58) Field of Classification Search
None
See application file for complete search history.

(56) References Cited

U.S. PATENT DOCUMENTS

| | | |
|---|---|---|
| 5,367,067 A | 11/1994 | Frische |
| 5,576,049 A | 11/1996 | Haas |
| 5,756,194 A | 5/1998 | Shogren |
| 6,117,925 A | 9/2000 | Tomka |
| 6,180,037 B1 * | 1/2001 | Andersen ............... C08L 89/06 264/108 |
| 6,231,970 B1 | 5/2001 | Andersen |
| 7,854,994 B2 * | 12/2010 | Henderson-Rutgers .................... B32B 1/02 524/53 |
| 9,416,275 B2 | 8/2016 | Villada |
| 11,168,203 B2 | 11/2021 | Fahrngruber |
| 2020/0048436 A1 | 2/2020 | Chen |
| 2021/0363335 A1 | 11/2021 | LaPray |
| 2022/0002445 A1 | 1/2022 | Chen |
| 2022/0041842 A1 | 2/2022 | Yubao |

OTHER PUBLICATIONS

English abstract of CN 109369942 A, Feb. 22, 2019, China.*

* cited by examiner

*Primary Examiner* — Tae H Yoon

(57) ABSTRACT

The invention relates to a method for producing a biodegradable thermoplastic starch-based article intended to come into contact with foodstuffs. In this method, the semi-crystalline starch granules are transformed into a homogeneous and almost amorphous material, called thermoplastic starch, by the addition of plasticizers at high temperatures and under shear. Thermoplastic starch is modified with organic acid during melt processing to prevent the retrogradation of starch. Moreover, cellulose derivatives are used as the reinforcement filler of thermoplastic starch. The article is produced using hot-pressing and then coating by immersion in a waterproofing solution.

16 Claims, 1 Drawing Sheet

BIODEGRADABLE AND WATERPROOF SHAPED ARTICLES BASED ON THERMOPLASTIC STARCH WITH LOWER RETROGRADATION AND IMPROVED MECHANICAL PROPERTIES

TECHNICAL FIELD

The present invention relates to a method for producing waterproof articles made of thermoplastic starch with good resistance to aging.

BACKGROUND OF THE INVENTION

Environmental concerns about the growing use of plastics and the associated waste have increased in recent decades. Much effort has recently been made to reduce the negative environmental impacts of oil-based polymers, especially in the packaging industry. Accordingly, food packaging materials made from biodegradable polymers are now in the spotlight because their environmentally friendly properties provide an attractive solution for the petroleum-based plastic waste problems.

Starch is a natural polymer which has advantages over other biodegradable polymers such as abundance, low cost and renewability. Native starch cannot be melt processed via conventional plastic equipment, since its decomposition temperature is lower than its melting point. This drawback can be overcome by destroying the hydrogen bonding network between the starch granules when it is processed in the presence of plasticizers at elevated temperatures and under shear. This material is called thermoplastic starch (TPS). The most commonly used plasticizers are water and polyols such as glycerol, sorbitol, ethylene glycol, xylitol and maltitol.

Sodium alginate is a natural hydrophilic polysaccharide extracted from marine brown algae and has potential applications in the food industry as a thickening agent, gelling agent, emulsifier, stabilizer and texture-improver. It is also widely used in the pharmaceutical, cosmetic and textile industries. Recently, sodium alginate has been shown to have a plasticization effect on TPS.

TPS is one of the most promising bio-based materials for various applications such as packaging and coating and is a suitable alternative to petroleum-based polymers. However, the TPS suffers from several limitations which make it unsuitable for some applications such as food packaging. The main disadvantages of TPS are dominant hydrophilic character, poor mechanical properties and processability, and aging of products with increasing storage time due to retrogradation (re-crystallization).

When starch granules are heated in the presence of water above a certain temperature, they undergo an order-disorder phase transition called gelatinization. Upon cooling, the starch chains align to form crystalline lamellas. These molecular interactions are called "retrogradation", which changes the performance, quality and shelf-life of the products. To overcome this problem, a small amount of additives like some polysaccharides e.g. agar, guar gum, sodium alginate and carboxymethyl cellulose, or organic acids such as citric acid, acetic acid and ascorbic acid is used to prevent the retrogradation of TPS. The latter which is the chemical modification of starch involves the introduction of carboxyl and ester functional groups into the starch structure. When low molecular weight organic acids are added to the mixture of starch and plasticizers, partial esterification may occur during the extrusion process, resulting in the disruption of hydrogen bonds of starch molecules. The reduction of interactions between the starch molecules can dramatically prevent or reduce retrogradation. Moreover, TPS modification by organic acids results in improvement of the plasticization and processing ability of starch, and promotion of the compatibility between thermoplastic starch and other polymers.

In the field of patents, different publications are found related to waterproofing the starch-based articles. For example, U.S. Pat. No. 5,367,067 reveals a water-resistant, thermoplastic starch material comprising an acyl modified starch and a biodegradable plasticizer, wherein said acyl modified starch has a degree of substitution of at least 1.86, and is prepared from the reaction of (i) high amylose starch and (ii) an acylation agent which is a free acid or chloride or anhydride of at least one fatty acid.

U.S. Pat. No. 5,576,049 discloses a process applying a waterproof coating to at least a portion of a surface of a starch-based shaped element produced by baking a composition between two mold halves or by extrusion. That process is characterized in that a lacquer containing (i) at least one solvent selected from the group consisting of alcohols, ketones and esters, (ii) a hydrophobic and decomposable film-forming substance containing a hydrophobic alkyl cellulose and a water-insoluble cellulose ester of the group consisting of cellulose acetate butyrates, cellulose acetate propionates and cellulose acetates, and (iii) a hydrophobic and decomposable plasticizer.

U.S. Pat. No. 5,756,194 describes the manufacture of a water-resistant starch-based product comprising (i) an inner core comprising gelatinized starch, (ii) an intermediate layer of a natural resin such as shellac and rosin, and (iii) an outer layer of a biodegradable polyester such as poly(beta-hydroxybutyrate-co-valerate) (PHBV), poly(caprolactone) (PCL) and polylactic acid (PLA). However, no explanation was given of the starch gelatinization process.

While the methods described above are useful in providing hydrophobic starch-based articles, the safety of these materials must be evaluated when used for food packaging.

Food contact materials (plastics, paper, ceramics, glass, metals and alloys, etc.) might transfer their constituents into the food. The migration of these substances from packaging materials can affect the safety and quality of food. Therefore, the materials and articles intended to come into contact with food are subject to legally binding rules.

SUMMARY

One object of the invention is a novel thermoplastic starch with improved stability against retrogradation and good processing ability. Another object of the invention relates to enhance the water resistance of shaped articles. Moreover, in order to evaluate the safety of these articles intended to be used in food contact, overall migration tests are conducted.

To improve the resistance of TPS to retrogradation and its rheological behavior, chemical modification of starch is carried out with organic acids during melt processing.

More generally, the mechanical properties of starch plasticized with water/polyols mixture can be changed during storage, as a result of the retrogradation. The rate of retrogradation depends on the storage time, temperature, relative humidity, and plasticizer type and content. Exposure of TPS to humid environments causes accelerated retrogradation because absorbed water molecules may play a plasticizer role in TPS which can favor starch macromolecular mobility and allow the development of a crystalline structure during storage.

Among polyols, sorbitol has been reported to slow the rate of retrogradation due to its low water absorption and formation of strong bonds with starch. Although the sorbitol-plasticized starch has high tensile strength, elastic modulus and stiffness, it shows a brittle behavior with low elongation and also a high melt viscosity and processing torque. Therefore, the mixture of glycerol and sorbitol plasticizers provides a good balance between the mechanical properties and the melt processability.

In order to decrease the retrogradation rate, some plasticizers with amide groups, such as formamide, acetamide, urea or a formamide/urea mixture have been suggested. However, these plasticizers are not allowed to be used in some applications such as food packaging, food service ware and biomedical applications, because of the possible harmful effects on health.

The plasticizer used in the present invention is any one or combination of glycerol, sorbitol and sodium alginate.

The present invention provides a biodegradable and waterproof product produced from TPS. More particularly, this product does not contain any petroleum-based polymers. Thus, in order to overcome the poor mechanical properties of TPS, natural reinforcing materials such as carboxymethyl cellulose and microcrystalline cellulose are used. Carboxymethyl cellulose is an anionic, water-soluble, and linear polysaccharide derived from cellulose, with good biodegradability and low cost. This polymer is used as an effective additive in various fields of application such as detergents, cosmetics, textiles, papers, foodstuffs, and pharmaceuticals. Moreover, it can be used as a reinforcement agent in biopolymers. Microcrystalline cellulose is an odorless, tasteless, porous white powder derived from the acid hydrolysis of cellulose. It is widely used in food, cosmetic and medical industries and also in bioplastics. This polysaccharide has excellent properties such as high specific surface area, high crystallinity, high strength, low density, biodegradability and renewability.

As already mentioned, TPS has a hydrophilic character, which makes difficult its use in food packaging. This problem according to the present invention is overcome by coating the TPS with PLA and nitrocellulose.

Nitrocellulose, also called cellulose nitrate, is a cellulosic compound produced by treating common cellulose with nitric acid in the presence of the sulfuric acid catalyst and water, resulting in the substitution of hydroxyl groups (—OH) to nitro groups (—$NO_2$) in the polymer structure. The content of nitrogen in nitrocellulose, varying from 10 to 14 percent, determines its physical and chemical properties and industrial applications. Nitrocellulose with nitrogen content below 12.3 percent is widely used in pharmaceuticals, lacquers, coatings, inks, leather and food packaging. Nitrogen content above 12.6 percent is classified as an explosive. The biodegradability of nitrocellulose makes it a suitable alternative for non-biodegradable polymers. Moreover, nitrocellulose is a prior-sanctioned food ingredient for use in the manufacture of paper and paperboard products used in food packaging (21CFR181.30). It is also an approved indirect food additive (21CFR175.105; 21CFR175.300; 21CFR176.170; 21CFR177.1200). Nitrocellulose-based waterproof coatings were initially developed by DuPont in the 1930s and are still being used today. This polymer is one of the coatings applied on cellophane film to provide a better moisture and oxygen barrier.

DETAILED DESCRIPTION OF THE INVENTION

The first objective of the disclosure is to provide a thermoplastic starch-based article that has a low retrogradation rate during the storage time. This object is achieved by chemical modification of TPS with organic acids, and by the addition of retrogradation inhibitors such as sodium alginate, carboxymethyl cellulose and microcrystalline cellulose.

The organic acid promotes the fragmentation of starch granules and destroys its intermolecular and intramolecular hydrogen bonds, thereby improving the interaction between starch and the plasticizer. As a result, the stronger hydrogen bonds of starch with the plasticizer make it more difficult to re-crystallize during the storage time of TPS. Moreover, the TPS processing in the presence of organic acid can decrease its melt viscosity, glass transition temperature ($T_g$) and melting point ($T_m$) and improve its fluidity.

Figure 1:
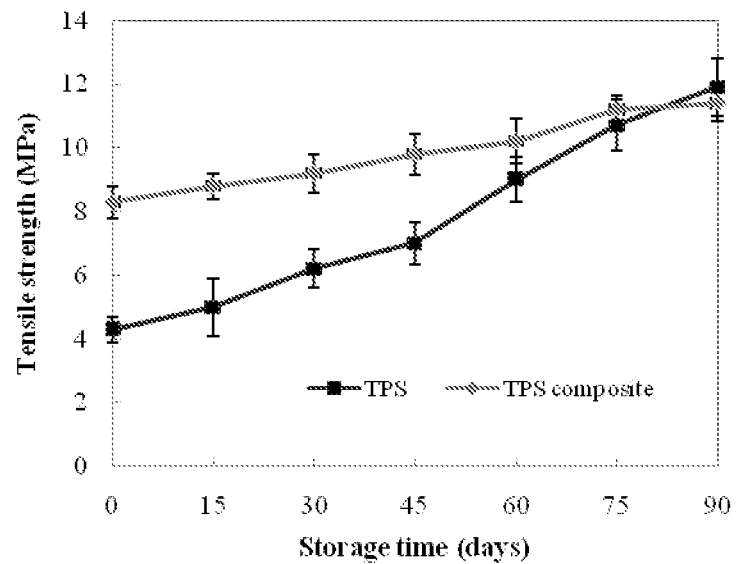
FIG. 1 shows the effect of aging on the tensile strength of TPS and TPS composite films of Example 1.
Figure 2:
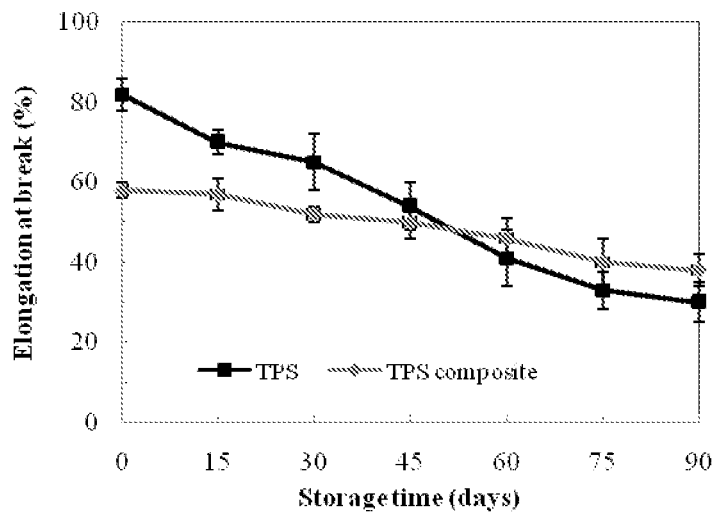
FIG. 2 shows the effect of aging on the elongation at break of TPS and TPS composite films of Example 1.

The increase in the degree of crystallinity of TPS with increasing storage time results in a decrease in the elongation at break and an increase in the tensile strength of the product (FIGS. 1 and 2). After storage for three months, the samples show higher tensile strength and lower elongation at break values as a result of the retrogradation process. This effect is much less pronounced in the case of the TPS composites containing sodium alginate and carboxymethyl cellulose (or microcrystalline cellulose). Reducing retrogradation by the addition of sodium alginate can be explained by the fact that it acts as a strong water binder, effectively depriving the starch chain of usable water for recrystallization and preventing retrogradation. In the presence of microcrystalline cellulose, the decreased recrystallization of TPS can be attributed to the strong starch-cellulose interactions and the limited mobility of starch chains. In the case of carboxymethyl cellulose, both mentioned conceptions can be regarded as being true.

The present formulations utilize sodium alginate as a plasticizer and retrogradation inhibitor, and carboxymethyl cellulose and microcrystalline cellulose as a reinforcement and retrogradation inhibitor.

The second objective of the disclosure is to provide a waterproof thermoplastic starch-based article.

Regarding the TPS solubility in water, the coating technique is an effective and economic method to prevent contact of water with the starch. In the present invention, PLA and nitrocellulose are used as a coating due to their hydrophobicity and biodegradability. The results show that nitrocellulose coating has higher adhesion strength compared to PLA coating. The high interfacial adhesion between nitrocellulose and TPS which is attributed to excellent compatibility and interaction between the nitrocellulose and TPS surface, improves the water resistance of TPS. Moreover, this coating provides a smoother, glossier, or scuff-resistant surface.

The present disclosure provides a method for producing the biodegradable articles made from natural substances instead of petroleum-derived plastics used in food packaging. Overall migration tests are performed to assess whether the TPS articles coated with nitrocellulose can be in contact with food. The total amount of migrated substances is then compared to the limit given in Regulation (EU) No 10/2011 and FDA Regulation 21 CFR175.300. The test conditions selected for the experiments comply with regulations of single-use plastic tableware. All the results from these biodegradable samples are below the overall migration limit (Table 1). Therefore, it can be concluded that this material is allowed for food contact applications.

The shaped articles provided herein meet the requirements of Commission Regulation (EU) No 10/2011 (plastic materials and articles intended to come into contact with food) and FDA Regulation 21 CFR175.300 (Indirect Food Additives: Adhesives and Components of Coatings). Furthermore, these products are non-toxic and eco-friendly with a low retrogradation rate during storage and good biodegradation performance.

The biodegradable thermoplastic starch-based article can comprise of 55-65 parts by weight of the starch, 9-12 parts by weight of the polyol plasticizer, 6.5-13 parts by weight of water, 2-4 parts by weight of the organic acid, 3-10 parts by weight of the reinforcement material, 12-18 parts by weight of the second plasticizer.

EXAMPLES

Example 1: A Method for Producing the TPS Composite Includes the Following Steps The citric acid (2 parts by weight) was firstly dissolved in water (7 parts by weight) and then mixed with one-half of the glycerol (10 parts by weight). Next, the cornstarch (59 parts by weight), which was previously dried for 12 h at 80 degree C. to have water content less than 1%, was gradually added and thoroughly mixed by using a high-speed mixer. The mixture was sealed in a plastic bag and stored overnight so that starch could be soaked with plasticizer. Sodium alginate (4 parts by weight) and the remainder of the glycerol (10 parts by weight) were mixed (named second plasticizer), and then blended with the premixed starch and microcrystalline cellulose (8 parts by weight). Afterward, reactive extrusion processing was performed by manual feeding of this mixture into a co-rotating twin-screw extruder (screw diameter (d)=20 mm, length: diameter (L/D) ratio=40:1) equipped with an efficient vacuum venting system to remove the water vapor. The screw speed was adjusted to 70 rpm. The temperature profile along the extruder barrel was 85-95-110-115-105 degree C. (from feed zone to die). The extruded filaments were air cooled and granulated using a blade grinder equipped with a nominal internal diameter of 2 mm. Finally, the TPS composite granules were hot-pressed for 5 min at 140 degree C. under a load of 2 MPa in order to produce TPS composite films with the approximate thickness of 0.8 mm. Subsequently, these films were immersed in a waterproofing solution, and then put into a hot-air oven at 40 degree C. for 4 h to evaporate the residual solvent. The waterproofing solution was comprised of a film-forming substance in a mixture of solvents. The solvent used in nitrocellulose coating was a mixture of acetone and ethyl acetate (70/30, v/v). The solvent used in PLA coating was a mixture of chloroform and dichloromethane (50/50, v/v). The concentration of the coating solution was fixed at 5% w/v to investigate the interfacial adhesion of the coating. The thickness of the coating layer was 15 to 50 micrometers. The overall migration values of TPS composite coated with nitrocellulose are presented in Table 1. The values were in the range of 0.41-4.87 mg/dm$^2$.

To analyze the effect of storage time on TPS retrogradation, the uncoated samples for mechanical testing were stored in closed containers at 23 degree C. with a relative humidity of 50% for three months. The measurement was repeated three times for each sample, and the results were averaged. In order to compare the results, the glycerol-plasticized starch (with a starch/glycerol ratio of 75/25 (% w/w)) was also produced. The changes in tensile strength and elongation at break with time are shown in FIGS. 1 and 2, respectively.

TABLE 1

Overall migration of TPS composite coated with nitrocellulose under standardized testing conditions

| Food simulant | Contact time and temperature | Standard | Overall migration (mg/dm$^2$) | Migration limit (mg/dm$^2$) |
| --- | --- | --- | --- | --- |
| Distilled water | 30 min at 100 degree C. | FDA Regulation 21 CFR175.300 | 0.57 | 7.75 |
| Distilled water | 2 h at 66 degree C. | FDA Regulation 21 CFR175.300 | 0.41 | 7.75 |
| Ethanol 8% (v/v) | 2 h at 66 degree C. | FDA Regulation 21 CFR175.300 | 4.01 | 7.75 |
| Acetic acid 3% (w/v) | 2 h at 70 degree C. | Commission Regulation (EU) No 10/2011 | 3.42 | 10 |
| Ethanol 10% (v/v) | 2 h at 70 degree C. | Commission Regulation (EU) No 10/2011 | 4.87 | 10 |

Example 2

The acetic acid (3 parts by weight) was firstly dissolved in water (10 parts by weight) and then mixed with one-half of the glycerol (9 parts by weight). Next, the cornstarch (57 parts by weight), which was previously dried for 12 h at 80 degree C. to have water content less than 1%, was gradually added and thoroughly mixed by using a high-speed mixer. The mixture was sealed in a plastic bag and stored overnight so that starch could be soaked with plasticizer. Sodium alginate (3 parts by weight) and the remainder of the glycerol (9 parts by weight) were mixed (named second plasticizer), and then blended with the premixed starch and carboxymethyl cellulose (9 parts by weight). The other steps were similar to Example 1.

Example 3

The citric acid (2 parts by weight) was firstly dissolved in water (11 parts by weight) and then mixed with one-half of the glycerol (9 parts by weight). Next, the cornstarch (61 parts by weight), which was previously dried for 12 h at 80 degree C. to have water content less than 1%, was gradually added and thoroughly mixed by using a high-speed mixer. The mixture was sealed in a plastic bag and stored overnight so that starch could be soaked with plasticizer. Sodium alginate (4 parts by weight) and the remainder of the glycerol (9 parts by weight) were mixed (named second plasticizer), and then blended with the premixed starch and microcrystalline cellulose (4 parts by weight). The other steps were similar to Example 1.

Example 4

The citric acid (3 parts by weight) was firstly dissolved in water (9 parts by weight) and then mixed with sorbitol (6 parts by weight) and one-half of the glycerol (6 parts by weight). Next, the cornstarch (60 parts by weight), which was previously dried for 12 h at 80 degree C. to have water content less than 1%, was gradually added and thoroughly mixed by using a high-speed mixer. The mixture was sealed in a plastic bag and stored overnight so that starch could be soaked with plasticizers. Sodium alginate (6 parts by weight) and the remainder of the glycerol (6 parts by weight) were mixed (named second plasticizer), and then blended with the premixed starch and carboxymethyl cellulose (4 parts by weight). The other steps were similar to Example 1.

We claim:

1. A method for producing a biodegradable thermoplastic starch-based article, comprising: (a) dissolving of an organic acid in water, and then mixing with polyol plasticizer and starch to obtain a homogeneous material; storing the mixture in a sealed plastic bag overnight so that starch could be soaked with plasticizer; adding a reinforcement material and second plasticizer to the premixed starch blend and then manual feeding of this mixture into a co-rotating twin-screw extruder (screw diameter (d)=20 mm, length: diameter (L/D) ratio=40:1) at a screw speed of 70 rpm; (b) hot-pressing of the extruded mixture at 140 degree C. to obtain a shaped article; (c) coating of the shaped article by immersion in a waterproofing solution.

2. The method of claim 1, wherein the biodegradable thermoplastic starch-based article comprises 55-65 parts by weight of the starch, 9-12 parts by weight of the polyol plasticizer, 6.5-13 parts by weight of water, 2-4 parts by weight of the organic acid, 3-10 parts by weight of the reinforcement material, 12-18 parts by weight of the second plasticizer.

3. The method of claim 1, wherein the starch is cornstarch.

4. The method of claim 1, wherein the organic acid is citric acid, acetic acid, ascorbic acid or a combination thereof.

5. The method of claim 1, wherein the polyol plasticizer is glycerol, sorbitol or a combination thereof.

6. The method of claim 1, wherein the reinforcement material is carboxymethyl cellulose, microcrystalline cellulose, or a combination thereof.

7. The method of claim 1, wherein the second plasticizer is a mixture of sodium alginate and glycerol.

8. The method of claim 1, wherein the starch is dried for 12 h at 80 degree C. to have water content less than 1%.

9. The method of claim 1, wherein the extrusion processing is performed under the following temperature profile along the extruder barrel (from feed zone to die): 85-95-110-115-105 degree C.

10. The method of claim 1, wherein the thermoplastic starch-based article is produced by the twin-screw extruder equipped with an efficient vacuum venting system to remove the water vapor.

11. The method of claim 1, the hot-pressing is performed at 140 degree C. and 2 MPa for 5 min.

12. The method of claim 1, wherein the waterproofing solution comprises a film forming substance in a mixture of solvents.

13. The method of claim 12, wherein the film-forming substance is nitrocellulose or polylactic acid.

14. The method of claim 12, wherein the solvents used in nitrocellulose coating are acetone and ethyl acetate.

15. The method of claim 12, wherein the solvents used in polylactic acid coating are dichloromethane and chloroform.

16. The method of claim 1, wherein the coating layer has a thickness of 15 to 50 micrometers.

* * * * *